March 25, 1930.  T. SCHOU  1,751,559
METHOD OF STANDARDIZING THE MANUFACTURE OF DYNAMO ELECTRIC MACHINES
Filed March 21, 1923
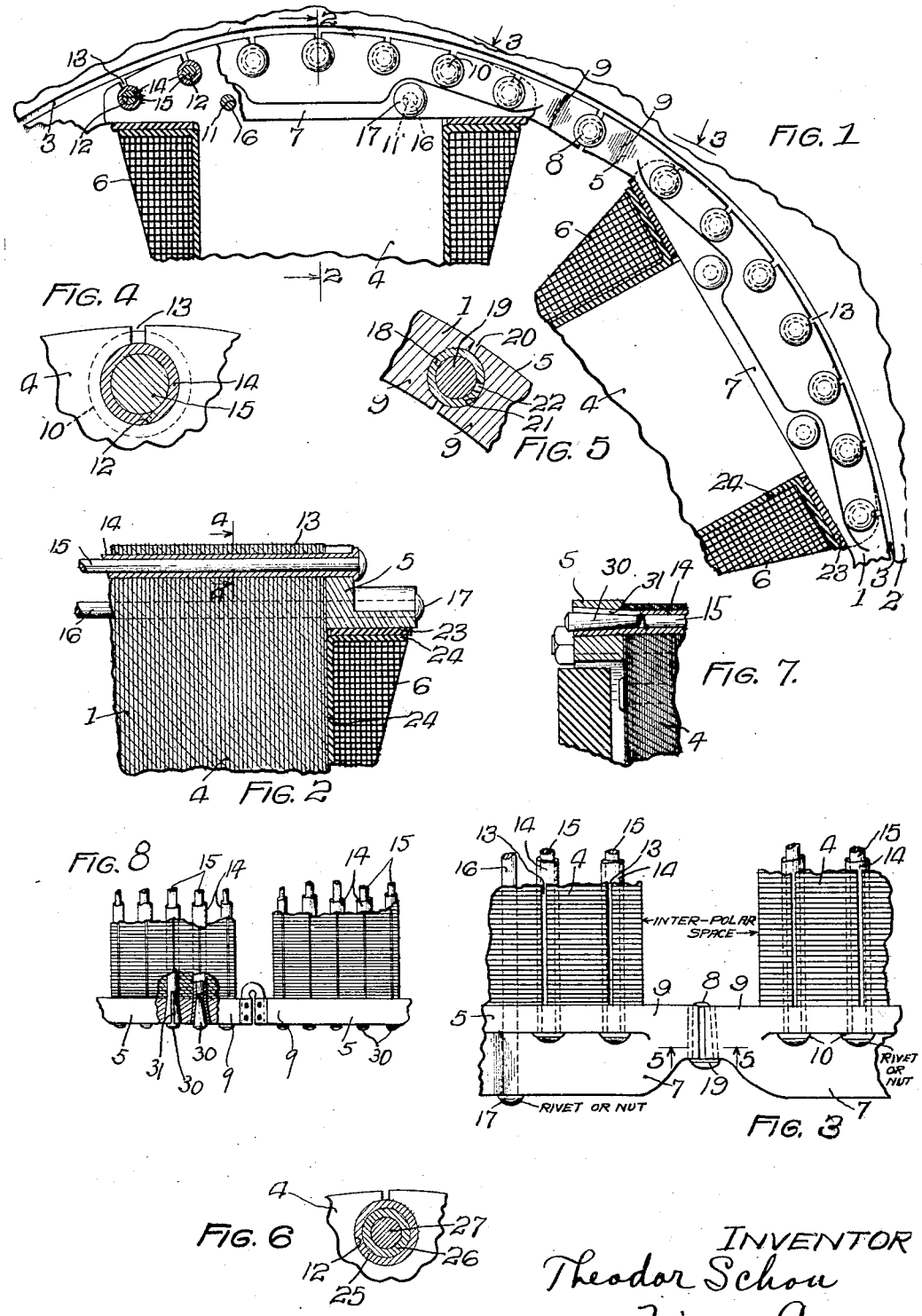
INVENTOR
Theodor Schou
By Nissen & Crane
ATTYS.

Patented Mar. 25, 1930

1,751,559

UNITED STATES PATENT OFFICE

THEODOR SCHOU, OF MANSFIELD, OHIO, ASSIGNOR TO THE IDEAL ELECTRIC & MANUFACTURING COMPANY, OF MANSFIELD, OHIO, A CORPORATION OF OHIO

METHOD OF STANDARDIZING THE MANUFACTURE OF DYNAMO-ELECTRIC MACHINES

Application filed March 21, 1923. Serial No. 626,452.

This application is a continuation in part of my co-pending application, Serial No. 396,250, filed July 14, 1920, for squirrel cage windings. The said co-pending application is directed to improved apparatus whereas the claims hereto appended cover methods of assembling.

My invention relates to a method of standardizing the manufacture of dynamo electric machines, and the like.

One of the objects of the invention is the provision of a simple and efficient method of assembling standardized parts of dynamo electric machines, particularly self-starting synchronous alternating motors having squirrel cage means for assisting in starting.

A further object is the provision of certain preformed parts of the squirrel cage of alternating current motors to facilitate the assembly thereof in motors of various sizes and current-conducting capacities.

More particularly it is the object of the present invention to provide an improved method of forming squirrel cage windings by having certain parts preformed to facilitate more efficient standardization and economy in manufacture and yet adapted to accommodate extensive variations in design for different current capacities and purposes with a minimum number of sizes, gauges and parts.

A further object of the invention is the provision of a method of assembling squirrel cage windings by providing bar conductors having a variety of current-conducting capacities and assembling the same with rings having connections in common, such assembly being in a style adapted for interchangeability in accordance with the resistance, reluctance and current capacity required in the motor being manufactured.

A further object of the invention is an improved method of assembling a squirrel cage winding by having the end rings of standard size and form and providing conductors adapted for ready adjustment with its current-conducting capacity and other essential characteristics either before or after connection to the end rings.

Another object of the invention is the provision of an improved method for mutually connecting the parts of a segmental end ring applicable after assembling the ring members on the core and assembling the sections of the segmental squirrel cage ring to the core in a manner adapted to prevent displacement by centrifugal force, and to serve also as a seat for the adjacent parts of the field coils at their outer ends and thereby more effectually combining economical manufacturing features with flexibility of design.

Other objects of the invention will appear hereinafter, the novel features and combinations being set forth in the appended claims.

An illustrative embodiment of this invention is shown in the accompanying drawings, forming a part of this specification, and in which—

Fig. 1 is mainly a side view of a segment of the outer part of a rotary field member of a synchronous alternating motor, showing two pole-pieces and squirrel cage means thereon to assist in starting, parts of the view being in section;

Fig. 2 is a fragmentary section taken in an axial plane at 2—2 in Fig. 1 looking in the direction of the arrows;

Fig. 3 is a fragmentary view of the outer face of a part of one of the squirrel cage end rings and adjacent parts as viewed at 3—3 in Fig. 1 looking in the direction of the arrows;

Fig. 4 is an enlarged sectional view taken on the line 4—4 in Fig. 2 looking in the direction of the arrows;

Fig. 5 is an enlarged sectional view taken on the line 5—5 of Fig. 3 looking in the direction of the arrows;

Fig. 6 is a cross-sectional view similar to Fig. 4 but illustrating a modification in having the conductor bar multi-tubular;

Fig. 7 is a view similar to Fig. 2 but showing the tubes and magnetic metals secured in a different manner; and Fig. 8 is a view similar to Fig. 3 but on a smaller scale and showing the form of fastening for the tubes indicated in Fig. 7.

In the construction shown in the drawings, the rotor 1 including the field members is surrounded by the stator 2 with an air gap 3 between their opposing faces. The rotor 1 includes a series of laminated pole-pieces 4, the outer ends of which are provided with and mechanically connected to a squirrel cage winding comprising the end rings 5 and the spaced-apart cross bars. Inwardly disposed from each squirrel cage winding on each pole-piece is a magnetizing coil 6, the outer end of which is seated against a bracket-like member 7 formed integrally with the end rings of the squirrel cage winding. Means are provided midway between adjacent ends of the poles 4 for electrically connecting the adjacent ends of the end ring segments 9.

The pole-pieces are provided with perforations at 11 and 12 which extend transversely through the laminations. Extending through each of the perforations 11 is a steel bolt or rivet 16 which also extends through spaced-apart portions of the clamping brackets 7, the outer end of the bar 16 being secured by means of a nut, or by riveting, as shown at 17 in Figs. 1, 2 and 3. It will thus be seen that by means of the brackets 7 and the bolts or rivets 16 the laminations may be clamped together rigidly and at the same time a portion or segment 5 of the squirrel cage winding secured in position with extending arcuate end portions 9 adapted to be connected electrically by the construction shown in Fig. 5.

The connection shown at 8 in Fig. 5 for the end ring segments includes a split sleeve 18 of good current-conducting material and a wedging core 19, preferably also of good conducting material. The ends of the segments 9 are separated slightly by a gap, as shown at 20. The inner opposing faces of the aperture 21 for the sleeve 18 are reamed to receive a tapered form of sleeve 18 and plug or wedge 19, so that when the latter is driven into place the split sleeve 18 is expanded tightly against the conical faces of the aperture 21; such expansion of the sleeve 18 may take place by reason of the split side shown at 22. This provides a very secure electrical and mechanical connection but when required the ring segments may be readily disconnected.

Insulation for the inner faces of the squirrel cage brackets 7 is provided at 23 to supplement the regular coil winding insulation shown at 24.

The squirrel cage conductors proper are mounted in the holes 12 and extend through the laminations, as shown in Fig. 2. Transverse slots 13 extend from the outer faces of the pole-pieces to the holes which extend through the laminations, as shown at 13 in Figs. 1 and 3. The squirrel cage conductors are each of compound character and comprise a highly conductive tubular part 14 of low impedance, such as copper or brass, and a magnetic core part 15 of high reactance, such as iron or soft steel. The ends of the squirrel cage conductors may be riveted, as shown at 10 in the drawings. It should be noted that the riveting of the squirrel cage conductors proper assists the bolts or rivets 16 in clamping the laminations together and in securing the brackets 7 and the ring segments to the pole-pieces of the rotor.

A modified form of squirrel cage conductor is shown in Fig. 6 where the tubular member is of composite character including a plurality of concentric tubes 25 and 26, preferably of copper or brass surrounding the steel bolt or core 27.

It is to be noted that the above described form of squirrel cage winding has very marked advantages as to mechanical construction, electrical operation, and method of assembling. By being tubular instead of solid bars it is possible to obtain various resistances of the bars by merely varying the inside diameter of the tubes, thereby varying the thickness of the tube walls without varying the outside diameter thereof and so preventing the necessity of changing the size of the slots to be punched in the rotor laminations. The conductivity of the bars, that is to say, their current-conducting capacity, may be varied by selecting tubes of different wall thicknesses, or by combining a plurality of concentrically disposed relatively thin tubes. The tubes and bars are solid and preformed and assembled afterward thereby preventing electro-deposition or other inefficient methods of assembly.

In the case of synchronous alternating motors it is often desirable to start and pull into synchronism with a rather heavy load. Under running conditions the squirrel cage winding is not effective except for eliminating "hunting" or fluctuation due to current and voltage supply. As the starting conditions vary over a large range depending upon what the synchronous motor is driving, it will be readily understood that the design of the squirrel cage or starting winding will vary considerably both as a material and distribution thereof in different motors.

By means of my improved method of assembling I am able to obtain various starting characteristics with standard parts which are adapted to be formed from the same dies, jigs, and other machinery necessary for forming parts in various sizes for machines of different sizes. In other words, in order to economically manufacture efficient and durable dynamo electric machines of the character referred to, it is desirable to standardize parts which can be used in various designs of such machines. This reduces the number of dies, jigs and other machinery necessary for forming parts of various sizes for machines of different current-conducting capacities. This is particularly true with respect to the slot dies necessary for punching the holes in the pole laminations for imbedding the squirrel cage winding bars. By means of my improved method the magnetic parts may be made of standard form and size for a large variety of motor designs, and the design of the squirrel cage winding itself may be accommodated to the specific needs, rather than in selecting different core designs. This is accomplished by using tubing 14, the outer diameter of which is the same in all cases for a given range of requirements, but the thickness of the tube wall may vary over a large range, thus varying the resistance of the conductor used accordingly. This tubing 14 is preformed as such so that it may be inserted through the holes 12 in the laminations in tubular form either before the bar or rod 15 is placed in the tube or after the rod 15 has been placed in the tube 14.

The squirrel cage ring segments and the coil mountings including the pole laminations and the extensions thereof and the brackets 7 may be formed in predetermined sizes for various sizes of synchronous motors or other type of machine in which a squirrel cage winding is desired. The squirrel cage windings for different sizes of machines may be made up of the same parts and the conductors formed with different current-conducting capacities in order to provide the difference in the horse powers of the different machines. I am able to standardize the conductors and parts adjacent thereto by forming the openings 12 of a single standard size for many sizes of machines. I then put the preformed tubes 14 in the openings 12, the outer diameters of such tubes being standardized to fit the standardized openings 12. The capacity of the machine is varied by making the tubes 14 with their inner bores of various diameters so as to provide walls of different thicknesses.

By means of my improved method of assembling the parts of dynamo electric machines hereinbefore referred to, the brackets 7 and the clamping bolts or rivets 16 may first be secured in position so as to rigidly hold together the laminations 4 of the pole-pieces. Now for a given range of requirements of motor designs the completion of the assembly of the motor will include proper coil winding 6 and selection of tubes 14 having the desired wall thicknesses and the desired internal diameter so that when the iron or steel bars 15 are inserted into the tubes 14 and the latter inserted in the slots 12, the squirrel cage conducting bars will have the desired current-conducting capacity.

The conducting bars may comprise a plurality of telescoping tubes, as shown in Fig. 6, but it should be understood that in this form also the outer tube 25 is of uniform diameter so as to fit the slot 12 having the standardized diameter. The diameters of the bar 27, the tube 26, and the interior diameter of the tube 25 may be varied according to the design required. In this manner by changing the interior structure of the conductor bars having an outside diameter which has been standardized the method of assembly will have the advantages hereinbefore pointed out. An important feature of this method of assembly is that by standardizing the outer diameter of the conductor bars the openings in the ring segments and the punchings in the lamination blanks of the pole-pieces are standardized.

It should also be understood that by inserting a solid bar of magnetic material through the tube 14 I not only further vary the resistance but also the reactance or reluctance. Moreover, in thus using magnetic material I take advantage of the skin effect for pull-in purposes. At standstill, the frequency of the squirrel cage winding is identical with the line frequency, which is usually 60 cycles in the United States. At this frequency the skin effect is very pronounced and therefore at starting very little or no current will go through the inner magnetic conductor but the current will flow largely through the tube. When the rotor accelerates, the current frequency in the squirrel cage winding will decrease in proportion to the acceleration in speed, and as the speed increases the skin effect, or fictitious reluctance, will decrease, and near synchronous speed this inner conductor will allow currents to circulate and thus substantially held during the pull-in period.

Such a winding constructed from preformed solid tubes having a uniform diameter and uniform wall thicknesses throughout, allows good starting torque and good pull-in torque which results in high torque per kva. drawn from the supply means, or, in other words, the starting is accomplished with a minimum current inrush from the supply means.

It should be particularly noted that by assembling the squirrel cage winding with preformed copper or brass tubes and preformed iron bars inserted therein the desired design of squirrel cage winding may be quickly assembled and uniform results obtained in the electrical current-conducting capacities of the bars after being placed in the slots extending through the laminations.

In Figs. 7 and 8 a different method of securing the ends of the conductor tubes 14 is indicated. In this form the rods 15 are formed slightly shorter than the tubes 14 and wedge-shaped pins 30 are driven into the ends of the tubes 14 with the inner ends of the pins close to the rods 15, as clearly indicated in said Figs. 7 and 8. This expands the ends of the tubes 14 tightly against the openings 12 in the ring members 5. In some instances it is desirable to slot the tubes 14 as indicated at 31 on one or more sides so that the tubes 14 can be more easily expanded or wedged out to fit tightly against the walls of openings 12.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. The method of assembling squirrel cage windings of dynamo-electric machines, which consists in fitting tubular conductor bars having good conductivity in spaced slots of the core, inserting a solid bar of magnetic material in each of said tubular bars in close fitting relation thereto but non-integral therewith, and connecting said tubular bars by expansion of the ends thereof to end rings in rigid relation with said slotted core with the tubular and magnetic bars electrically connected to said end rings.

2. The method of constructing a squirrel cage winding for a dynamo electric machine which consists in assembling ring segments in a series corresponding to the pole-pieces of a dynamo electric machine, securing the segments in parts to the opposite sides of the pole-pieces respectively in electrically effective relation to each other, and then driving conducting wedge members between and in electrical contact with adjacent ends of the segments to secure continuous electrical conductivity through the rings.

3. A squirrel cage winding comprising a stack of laminations, a pair of spaced-apart end rings having perforations paired in alinement, cross-connecting tubes of high conductivity fitting in registering openings in said laminations and extending through the said paired perforations, conductor rods of magnetic material fitted in said tubes and extending between said rings, and wedging devices inserted into the ends of said tubes to rigidly connect the latter to said end rings.

4. In squirrel cage windings for synchronous alternating current motors, the combination with a laminated pole-piece, of a pair of brackets adapted to be clamped to opposite sides of such pole-piece, segments having spaced-apart perforations and connected to and carried by said pole-piece with the perforations in the segments registering with the slots in the pole-piece, compound bars imbedded in said slots in the pole-piece, said compound bars each comprising a tube with a rod inserted therein, means for clamping said brackets to said pole-piece, and tapered plugs in the ends of said tubes to electrically connect said tubes to said segments.

5. In squirrel cage windings for synchronous alternating current motors, the combination with a laminated pole-piece with punchings therein to form transverse slots, of spaced-apart end rings for the squirrel cage winding, compound conducting bars comprising a tube of copper and a core of iron connected between said end rings and fitting in said transverse slots, and conical conducting plugs inserted into the split ends of said tubes to electrically connect the latter to said end rings.

6. In squirrel cage windings for dynamo-electric machines, the combination with a stack of laminations having spaced-apart slots therein, of end rings with paired perforations registering with the ends of said slots, tubes of copper fitting in said slots and having split ends extending through the perforations in the end rings, iron rods between the end rings and fitting in said tubes, and tapered conducting plugs inserted in the split ends of said tubes to electrically connect the same and said rods to the end rings.

7. The method of forming a squirrel cage winding on a slotted core, which consists in fitting tubular bars having comparatively good conductivity into spaced-apart slots in the core, then driving bars of magnetic material into the tubular bars in snug fitting relation therein and finally connecting end rings to the compound bars by expanding the ends of the tubular bars against the peripheries of openings in said rings.

8. The method of assembling squirrel cage windings of alternating current motors, which consists in forming a plurality of compound conductors each having a high reactance core part and a low impedance tube part respectively of magnetic and non-magnetic material, fitting such conductors in spaced-apart slots in the laminated core of the machine, combining end rings with such core and with said compound conductors, and wedging the ends of the conductors into electrical connection with said end rings and in fixed relation to such laminated core.

9. The method of assembling squirrel cage windings adapted for alternating current electrical machines, which consists in filling conductor tubes of high conductivity with magnetic material to within a short distance of the ends of the tubes to form compound bars, splitting the ends of the tubes, inserting the compound bars into slots of a laminated core of the electrical machine and driving tapering wedges into the split ends of the tubes to secure end rings to the electrical machine.

10. The method of assembling squirrel cage windings for alternating current electrical machines, which consists in forming a predetermined size of conductor openings in ring members, placing the conductor tubes in such openings in said ring members, and driving short conical wedges into the ends of the tubes to secure the latter to said ring members.

11. The method of assembling windings of dynamo-electric machines employing squirrel cage structures, which consists in fitting conductor tubes of uniform external diameter and standard size into slots and perforations, the thickness of the walls of each of said conductor tubes being predetermined in accordance with the desired horsepower of the machine, and then wedging out the end portions only of the tubes conically to connect the latter to spaced-apart end rings of the squirrel cage winding.

12. The method of assembling squirrel cage windings for alternating dynamo-electric machines which consists in constructing compound conductor bars having standardized outer diameters and composed of a preformed solid tube and a preformed core of magnetic material such as iron fitted into such tube, and connecting such conductor bars to end rings by wedging end portions only of the tubes to such rings on standard construction to form a squirrel cage winding.

13. The method of assembling dynamo-electric rotor squirrel cage windings, which consists in associating with a stack of laminations spaced-apart connecting rings of standardized size and form, placing in slots in such stack of laminations preformed compound bars or tubes of metal of high conductivity with rods therein of magnetic material such rods each being of predetermined diameter and length to fit the predetermined cross-sectional area of the interior of the tube to within short distances from the ends of said tubes, electrically connecting said rings with said compound bars after being arranged in spaced-apart relation in the openings of standardized size in said laminations, and securing the ends of the compound bars to said rings by circumferential wedging action applied to the end portions of said tubes to electrically connect such bars while also assisting in clamping the laminations together.

14. A squirrel cage winding for a dynamo-electric machine comprising a stack of laminations, a pair of end electric conducting members having perforations paired in alinement, a plurality of cylindrical tubular conductors having their ends disposed in said perforations, and conical wedging devices having exposed heads adapted to be hammered to insert such wedging devices into the ends of said cylindrical tubes to secure the latter mechanically and electrically to said end electric conducting members.

In testimony whereof I have signed my name to this specification on this 8th day of March, A. D. 1923.

THEODOR SCHOU.